United States Patent
Hirata

(10) Patent No.: US 7,624,365 B2
(45) Date of Patent: Nov. 24, 2009

(54) SEMICONDUCTOR INTEGRATED DEVICE AND APPARATUS FOR DESIGNING THE SAME

(75) Inventor: Morihisa Hirata, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 12/288,083

(22) Filed: Oct. 16, 2008

(65) Prior Publication Data

US 2009/0077516 A1 Mar. 19, 2009

Related U.S. Application Data

(62) Division of application No. 11/444,617, filed on Jun. 1, 2006, now Pat. No. 7,552,404, which is a division of application No. 10/784,620, filed on Feb. 23, 2004, now Pat. No. 7,076,757.

(30) Foreign Application Priority Data

Feb. 27, 2003 (JP) ............................. 2003-050251

(51) Int. Cl.
*G06F 17/50* (2006.01)
*H03K 5/08* (2006.01)
*H01L 23/62* (2006.01)
*H02H 3/00* (2006.01)

(52) U.S. Cl. ............... 716/8; 716/1; 716/7; 327/310; 257/355; 361/56; 361/57

(58) Field of Classification Search ............... 716/1, 716/7–14; 327/310–314; 257/355; 361/56–57
See application file for complete search history.

(56) References Cited

U.S. PATENT DOCUMENTS 5,886,558 A * 3/1999 Iijima et al. ................. 327/310

* cited by examiner

*Primary Examiner*—Paul Dinh
(74) *Attorney, Agent, or Firm*—Muirhead and Saturnelli, LLC

(57) ABSTRACT

A semiconductor integrated device includes a plurality of power system circuit units, a first circuit unit to which electric power is supplied from first power supply wiring, and first ground wiring to which the first circuit unit is coupled. Moreover, the semiconductor integrated device includes a second circuit unit to which electric power is supplied from second power supply wiring, and second ground wiring coupled to the second circuit unit. The first circuit unit includes a first interface circuit unit, and the second circuit unit includes a second interface circuit unit configured to perform inputting or outputting of a signal to and from the first interface circuit unit. The second interface circuit unit is placed in the vicinity of the first interface circuit unit according to a determined arrangement.

12 Claims, 5 Drawing Sheets

SEMICONDUCTOR INTEGRATED DEVICE AND APPARATUS FOR DESIGNING THE SAME

CROSS REFERENCE TO RELATED APPLICATIONS

This application is a divisional of U.S. patent application Ser. No. 11/444,617, filed Jun. 1, 2006 now U.S. Pat. No. 7,552,404, which is a divisional of U.S. patent application Ser. No. 10/784,620, filed Feb. 23, 2004 (now U.S. Pat. No. 7,076,757 issued Jul. 11, 2006), which are both incorporated herein by reference.

BACKGROUND OF THE INVENTION

1. Field of the Invention

The present invention relates to a semiconductor integrated device and an apparatus for designing the same, more specifically, to a semiconductor integrated device including a plurality of circuits to be operated by a plurality of power supplies and an apparatus for designing the same.

2. Description of the Prior Art

Along with an increase in cell density of a semiconductor integrated device (hereinafter abbreviated as an "LSI") and advance in the digital technology in recent years, circuits including digital circuits and analog circuits in single LSI chips are embedded in many products. In a digital camera or video equipment, for example, a DA converter and an AD converter for converting signals between analog signals and digital signals are embedded as a single chip.

Each of the digital circuit and the analog circuit embedded in the single chip is operated by a plurality of different power systems. Moreover, when the circuits operated by the plurality of different power systems are placed on the single LSI chip, the LSI requires a design in terms of electrostatic discharge (ESD) designing which is different from the ESD designing for a circuit including a single power system.

In particular, as miniaturization of an LSI progresses, the ESD designing in consideration of the miniaturization requires many processes at design and development stages. Accordingly, an increase in the development period is unignorable.

As described above, in order to prevent damage by electrostatic discharge in an LSI device including two or more sets of power supply wiring, there are known various aspects of inserting an ESD protection element between high-potential power supply wiring and a low-potential power supply wiring. A typical technique thereof is disclosed in Japanese Unexamined Patent Publication No. 9 (1997)-172146, for example.

An LSI device in this prior art includes first and second power supply lines. Moreover, a high-potential side of the first power supply line and a high-potential side of the second power supply line are separated meanwhile, a low-potential side of the first power supply line is coupled to a low-potential side of the second power supply line through a protection circuit (HK).

In this way, destruction of an element inside a second circuit attributable to a rise in electric potential on the low-potential side of the first power supply line is prevented. Besides, there are also known a technique to couple a high-potential side of a power system to a low-potential side of a different power system through a protection element, a technique to couple a protection element between a signal line of a first power system and a ground line of a second power system, and the like.

However, the present inventor has recognized that the prior part did not consider nodes of respective circuits on the high-potential side of the power supply line or on the low-potential side of the power supply line. Accordingly, this prior art causes variation of ESD tolerance and it is therefore difficult to manufacture an LSI with sufficient ESD tolerance.

Moreover, in terms of a circuit chip including an analog function cell and a digital circuit using different power supplies, there is also known a technique to insert a level conversion circuit for performing level conversion between an input/output signal of an analog function circuit and an input/output signal of the digital circuit, which is configured to draw in both of the power supply to be supplied to the analog function cell and the power supply to be supplied to the digital circuit. For example, the technique to insert the level conversion circuit is disclosed in Japanese Unexamined Patent Publication No. 10 (1998)-150364.

The present inventor has recognized that this technique was a technique concerning optimization of a circuit area and was not designed in light of improvement in the ESD tolerance. Accordingly, occurrence of wiring resistance or wiring delay is unignorable, and the ESD tolerance is thereby varied.

Therefore, it is an object of the present invention to provide an LSI device and an apparatus for designing an LSI device, which are capable of effectively suppressing ESD destruction inside a circuit.

SUMMARY OF THE INVENTION

A semiconductor integrated device according to a first embodiment of the present invention, comprising: a first circuit unit to which electric power is supplied from first power supply wiring; first ground wiring to which the first circuit unit is coupled; a second circuit unit to which electric power is supplied from second power supply wiring; second ground wiring coupled to the second circuit unit; a first interface circuit unit formed in the first circuit unit; and a second interface circuit unit formed in the second circuit unit, the second interface circuit unit being configured to perform any of inputting and outputting a signal to and from the first interface circuit unit, wherein the first ground wiring is coupled to the second ground wiring, and the second interface circuit unit is placed in the vicinity of the first interface circuit unit. By adopting this configuration, it is possible to reduce the wiring resistance and thereby to suppress an influence of an ESD current.

In addition, a semiconductor integrated device according to a second embodiment of the present invention, comprising: a first circuit unit to which electric power is supplied from first power supply wiring; first ground wiring to which the first circuit unit is coupled; a second circuit unit to which electric power is supplied from second power supply wiring; second ground wiring coupled to the second circuit unit; a first interface circuit unit formed in the first circuit unit; and a second interface circuit unit formed in the second circuit unit, the second interface circuit unit being configured to perform any of inputting and outputting a signal to and from the first interface circuit unit, wherein the first ground wiring is coupled to the second ground wiring, and the second interface circuit unit is coupled to the second ground wiring in the vicinity of a node for the first ground wiring and the second ground wiring.

Moreover, a semiconductor integrated device according to a third embodiment of the present invention, comprising: a first circuit unit to which electric power is supplied from first power supply wiring; first ground wiring to which the first circuit unit is coupled; a second circuit unit to which electric power is supplied from second power supply wiring; second ground wiring coupled to the second circuit unit; a first interface circuit unit formed in the first circuit unit; and a second interface circuit unit formed in the second circuit unit, the second interface circuit unit being configured to perform any of inputting and outputting a signal to and from the first interface circuit unit, wherein the first ground wiring is coupled to the second ground wiring, and an external connection pad is coupled to the second ground wiring in the vicinity of a node for the first ground wiring and the second ground wiring.

DETAILED DESCRIPTION OF THE PREFERRED EMBODIMENTS

Figure 1:
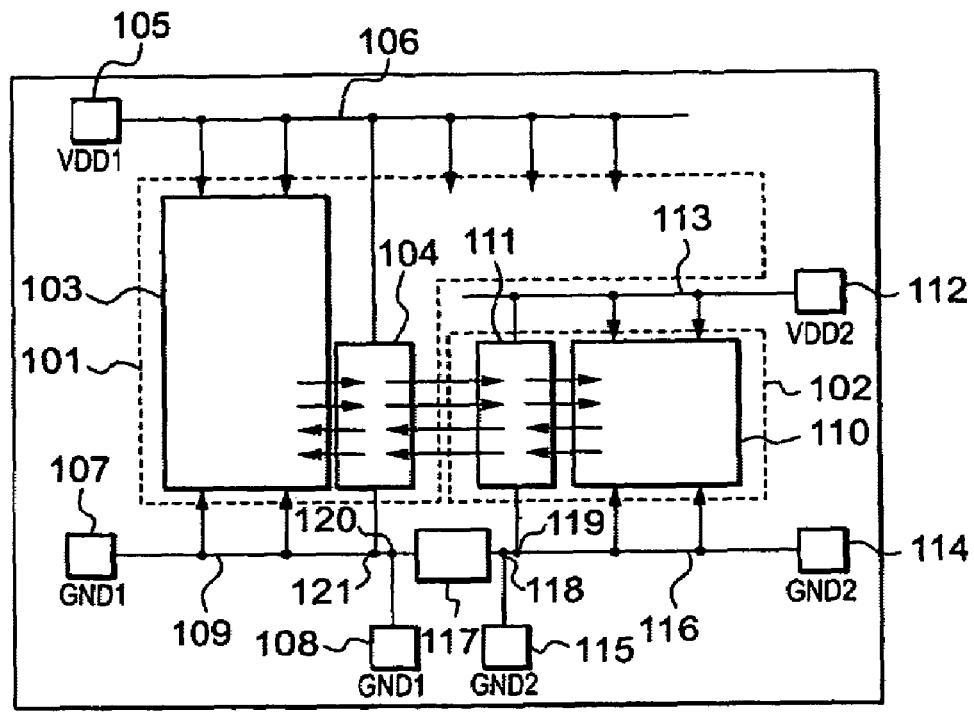
FIG. 1 depicts a circuit configuration of an LSI device according to a first embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Firstly, embodiments of an LSI device of the present invention will be described in detail with reference to the accompanying drawings.

In the respective drawings, elements designated by the same reference numerals denote the same elements, and duplicate explanations will be omitted as appropriate. The following description is provided for explaining the embodiments of the present invention and it is to be noted that the present invention shall not be limited only by the following embodiments. For the purpose of clarification of the explanations, the following description will be abridged or simplified when appropriate. Moreover, for those skilled in the art, it is easily possible to modify, add, and/or substitute the respective elements in the following embodiments within the scope of the present invention.

First Embodiment

FIG. 1 is a block diagram for describing a schematic circuit configuration of an LSI device according to a first embodiment. With reference to FIG. 1, the LSI device of the first embodiment includes a first power system circuit unit 101 which is operated by electric power supplied from a first power system, and a second power system circuit unit 102 which is operated by electric power supplied from a second power system.

Typical examples of the first power system circuit unit and the second power system circuit unit are a digital circuit unit and an analog circuit unit to be placed in an LSI chip. Other examples may include an LSI device configured to use different power systems between a digital internal circuit and an input/output interface circuit unit.

Moreover, the digital circuit unit, for instance, has a larger number of elements than the analog circuit unit, and the digital circuit unit, also, has a larger chip area than the analog circuit unit.

In a hybrid circuit configured to incorporate the digital circuit unit and the analog circuit unit into a one-chip LSI device, a power pad and a ground pad of the analog circuit unit are provided differently from a power pad and a ground pad of the digital circuit unit so as to suppress deterioration in characteristics of the analog circuit attributable to noise components generated in the digital circuit unit. Moreover, a circuit inside the digital circuit unit and a circuit inside the analog circuit unit include different power supply wiring and ground wiring, whereby the digital circuit unit and the analog circuit unit are operated as different power systems.

The circuit configuration of FIG. 1 will be now described. The first power supply system circuit unit 101 of the LSI device according to the first embodiment includes a first power supply system internal circuit unit 103 in which signal exchanges are carried out among the elements that are supplied the electric power by the first power supply, and a first power supply system input/output circuit unit 104 in which signal exchanges are carried out among the elements that are supplied the electric power by the second power supply.

The LSI device of the first embodiment includes a first power system power pad 105 to which a first power voltage (VDD1) is supplied from a power supply arranged outside the circuit, and first power system power supply wiring 106 coupled to the first power system power pad 105 for transmitting the power voltage to be supplied from the first power system power pad 105.

The first power system internal circuit 103 and the first power system input/output circuit 104 are coupled to the first power system power supply wiring 106, and the necessary electric power is supplied thereto. The LSI device according to the first embodiment further includes first power system ground pads (107 and 108) coupled to a ground circuit unit outside the circuit and provided with ground potential (GND1).

In other words, the first power system circuit unit 101 of this embodiment includes the two ground pads.

The LSI device according to the first embodiment further includes first power system ground wiring 109 coupled to the first power system ground pads 107 and 108 and configured to provide the ground potential to the first power system circuit unit 101. The first power system internal circuit 103 and the first power system input/output circuit 104 are coupled to the first power system ground wiring 109, whereby the necessary ground potential is supplied thereto.

The second power supply system circuit unit 102 includes a second power system internal circuit unit 110 in which signal exchanges are carried out among the elements that are supplied the electric power by the second power supply, and a second power supply system input/output circuit unit 111 in which signal exchanges are carried out among the elements that are supplied the electric power by the first power supply.

Moreover, the LSI device of the first embodiment includes a second power system power pad 112 to which a second power voltage (VDD2) is supplied from a power supply arranged outside the circuit, and second power system power supply wiring 113 coupled to the second power system power pad 112 for transmitting the power voltage to be supplied from the second power system power pad 112.

Each of the first power system input/output circuit and the second power system input/output circuit is an example of an interface circuit. The interface circuit includes a circuit configured to perform any one of input and output, or a circuit configured to perform both input and output.

The second power system internal circuit 110 and the second power system input/output circuit 111 are coupled to the second power system power supply wiring 113, and the necessary electric power is supplied thereto. Second power system ground pads (114 and 115) are coupled to a ground circuit unit outside the circuit and provided with ground potential (GND2). The second power system of this embodiment includes the two ground pads. Second power system ground wiring 116 for providing the ground potential to the second power system circuit 102 is coupled to the second power system ground pads 114 and 115.

The second power system internal circuit 110 and the second power system input/output circuit 111 are coupled to the second power system ground wiring 116, whereby the necessary ground potential is supplied thereto.

The first power system ground wiring 109 is coupled to the second power system ground wiring 116 through an electrostatic discharge (ESD) protection element 117. The protection element 117 includes a function to conduct the two sets of ground wiring and to flow an electric current therebetween when electric potential between the sets of the ground wiring reaches a predetermined value. The ESD protection element 117 is preferably bidirectional, and a transistor, a bidirectional diode or the like can be used.

Here, the protection element 117 can be used when the element is necessary according to the circuit design. The protection element 117 is particularly useful for suppressing unfavorable interactions between the analog circuit and the digital circuit, for example, when digital noises are likely to affect the analog circuit. When the protection element is not necessary, the first power system ground wiring can be coupled to the second power system ground wiring through a node where no particular element is placed. Such a node only needs to be a point in a circuit and is not limited to a point which is visually recognizable.

Moreover, the values of the electric potential on the two power system may be either different or identical. Whereas the ground potential is set to a value lower than the power supply potential, those potential values are appropriately determined by designing. The values of the ground potential to be provided to the two power system may be either identical or different in accordance with the circuit design. Moreover, although it is not shown in FIG. 1, the first power system power supply wiring 106 can be coupled to the first power system ground wiring 109 through a power supply protection circuit. Similarly, the second power system power supply wiring 113 can be coupled to the second power system ground wiring 116 through a power supply protection circuit. The aspects described above will also apply to other embodiments to be described later.

An influence by an ESD surge from outside which can cause electrostatic destruction of an LSI chip will be described with reference to FIG. 2. An LSI chip can incur electrostatic destruction by an ESD surge which is inputted from outside through a pad. To describe the electrostatic destruction caused by the ESD surge from the outside, description will be made below concerning electric potential inside the circuit when an ESD surge current flows from the first power system power pad to the second power system ground pad.

Description will be now made on the case when the ESD surge current flows from the first power system power pad to the second power system ground pad in the LSI of this embodiment. One of factors for the electrostatic destruction of the LSI is destruction of a gate oxide film of a MOS transistor. In the LSI device including the circuits in the different power systems, MOS transistors in the input/output circuit units between the circuits units in the different power systems; more particularly, destruction of a gate oxide film of the MOS transistor on the input side becomes a problem.

Figure 2:
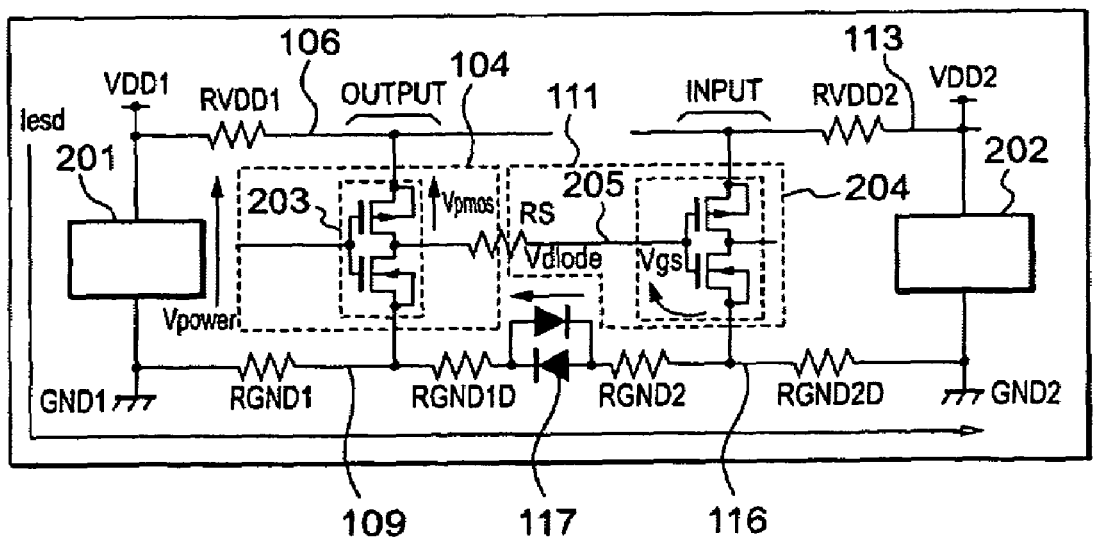
FIG. 2 depicts an influence of an ESD surge current in the LSI device of the first embodiment.

FIG. 2 is a circuit diagram for explaining the influence by the ESD surge current in this embodiment. Here, a simplified circuit is described for the purpose of clarifying the explanation.

With reference to FIG. 2, the elements designated by the same reference numerals as those in FIG. 1 are similar to the elements described in FIG. 1, and duplicate explanations will be omitted herein.

In FIG. 2, the first power system input/output circuit is defined as an output side, and the second power system input/output circuit is defined as an input side. Note that the input/output circuit corresponds to a final stage of a primitive block inside the LSI circuit, and is therefore different from an input/output circuit unit outside the LSI. A power supply protection circuit 201 is coupled between the first power system power supply wiring and the first power system ground wiring, and a power supply protection circuit 202 is coupled between the second power system power supply wiring and the second power system ground wiring. An output inverter 203 contained in the first power system input/output circuit unit 104 is a CMOS circuit which includes a PMOS to be coupled to the first power system power supply wiring 106 and an NMOS to be coupled to the first power system ground wiring 109. An input inverter 204 contained in the second power system input/output circuit unit 111 is a CMOS circuit which includes a PMOS to be coupled to the second power system power supply wiring 113 and an NMOS to be coupled to the second power system ground wiring 116. Signal wiring 205 couples the CMOS in the first power system to the CMOS in the second power system.

An applied potential difference between a gate and a source of the NMOS transistor in the second power system is defined as Vgs, and an applied potential difference between a source and drain of the PMOS transistor in the first power system is defined as Vpmos. Moreover, a clamp voltage of the power supply protection circuit 201 in the first power system is defined as Vpower, and a clamp voltage by the protection element 117 between the sets of the ground wiring in the first and second power systems is defined as Vdiode. Meanwhile, resistance of the first power system ground wiring from the first power system power supply protection circuit 201 to the first power system output inverter 203 is defined as RGND1, and resistance of the first power system ground wiring from the first power system output inverter 203 to the protection element 117 placed between the sets of the ground wiring is defined as RGND1D. Furthermore, resistance of the second power system ground Wiring from the protection element 117 placed between the sets of the ground wiring to the second power system input inverter 204 is defined as RGND2, and resistance of the second power system ground wiring from the second power system input inverter 204 to a GND pad 2 is defined as RGND2D.

When an ESD surge current is applied between the first power system power pad 105 and the second power system ground pad 114, the first power system power supply protection circuit 201 is turned on and the ESD surge current (Iesd) flows thereon. Examination will be made below on the case where the ESD surge current flows on the following path of the first power system power pad 105→the first power system power supply protection circuit 201→the first power system ground wiring 109→the protection element 117 between the set of the ground wiring→the second power system ground wiring 116→the second power system ground pad 114.

When the ESD surge is applied, a potential difference is generated inside the chip because of a voltage drop attributable to the wiring resistance existing on the path of the flow of the ESD surge current. When the ESD surge is applied between the first power system power pad 105 and the second power system ground pad 114, the voltage Vgs to be applied between the gate and the source of the NMOS of the second power system is calculated by:

$$Vgs=(Vpower+RGND1*Iesd+RGND1D*Iesd+Vdiode+RGND2D*Iesd)-Vpmos$$

A breakdown voltage of the applied potential difference (Vgs) of the NMOS transistor is defined as Vgs.max. To protect the NMOS from destruction due tot the breakdown voltage of the applied potential difference (Vgs) of the NMOS transistor, it is necessary to design the LSI such that the voltage Vgs does not exceed the breakdown voltage Vgs.max.

In the 130-nm class CMOS process, the thickness of the gate oxide film of the MOS transistor is about Tox=2 nm. Typically, destruction of the gate oxide film occurs when a potential difference of about 6 V is applied to the gate oxide film. When an ESD surge at 2000 V is applied in accordance with the human body model (HBM) standard, the peak of the ESD surge current Iesd is equal to 1.3 A. To pass an ESD tolerance test at 2000V in accordance with the HBM standard, it is necessary to design the LSI such that the voltage Vgs does not exceed 6 V even if this ESD surge current flows inside the LSI.

For example, when the clamp voltage Vpower of the power supply protection circuit is equal to 3.5 V, the clamp voltage Vdiode of a protection diode between the sets of the ground wiring is equal to 1.2 V, and the voltage Vpmos between the source and the drain of the PMOS of the output inverter is equal to 0 V, the ground wiring resistance needs to satisfy:

$$RGND1+RGND1D+RGND2D \leq (6\,V-3.5\,V-1.2\,V)/1.3\,A=1.0\,\Omega$$

As described above, when the ESD surge is applied, one of critical elements is to reduce the ground wiring resistance in the path for flowing the ESD surge current.

Next, the circuit configuration will be now described in a case which the ground wiring GND1 is directly coupled to the ground wiring GND2 without the protection device 117. In this case, a connection node between the ground wiring GND1 and the ground wiring GND2 is considered as a parasitic resistance. The value of the parasitic resistance is defined as RGND12, the voltage Vgs to be applied between the gate and the source of the NMOS of the second power system is calculated by:

$$Vgs=(Vpower+RGND1*Iesd+RGND1D*Iesd+RGND12*Iesd+RGND2D*Iesd)-Vpmos$$

As described with reference to FIG. 2, one aspect of the electrostatic destruction of the LSI chip is incurred by the ESD surge between the power pad and the ground pad in the mutually different power systems. Besides this aspect, the electrostatic destruction of the LSI chip may be incurred by emission of electric charges on the chip from the pad. A charged device model (CDM) test is a test concerning the electrostatic destruction of this type. The CDM test is a test for measuring the ESD tolerance of the LSI by means of short circuiting a measurement pin and an external GND in a state where electric charges are accumulated in the entire LSI chip.

Figure 3:
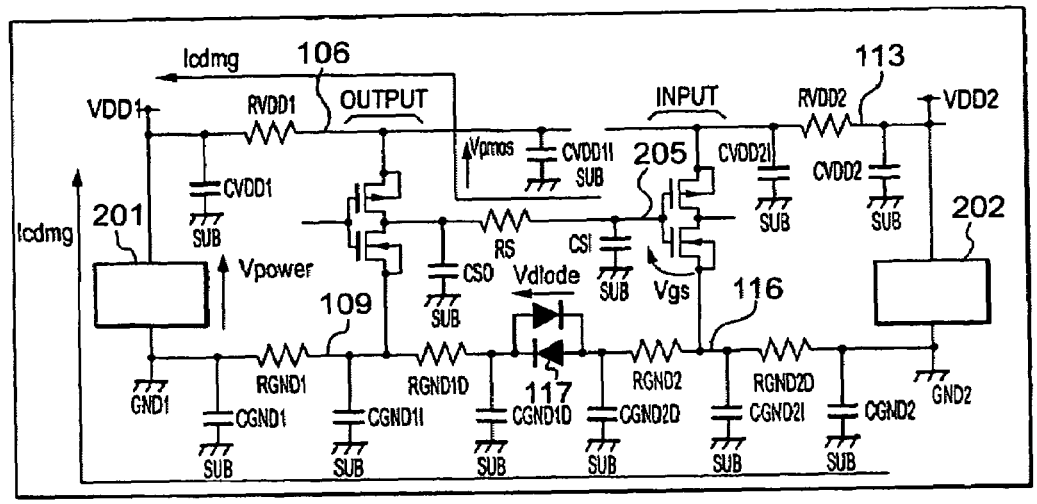
FIG. 3 also depicts the influence of the ESD surge current in the LSI device of the first embodiment.

Next, a discharging operation of the electric charges accumulated in the chip will be described with reference to FIG. 3. A circuit configuration shown in FIG. 3 is similar to the circuit in FIG. 2 except principal stray capacitors (CVDD1, CVDD1I, CVDD2I, CVDD2, CSO, CSI, CGND1, CGND1I, CGND1D, CGND2D, CGND2I, CGND2) which are additionally described therein, and the detailed description is therefore omitted.

Each of the principal stray capacitors is a stray capacitor provided between a substrate and any of the power supply wiring, the ground wiring, the signal wiring, and a diffusion layer. The electric charges accumulated in these stray capacitors are discharged from external connection pads. Description will be now made on a state inside the chip when the first power system power pad and the external GND are short circuited in the state where the electric charges are accumulated and then the electric charges accumulated inside the LSI chip are thereby discharged.

An electric current generated by movement of the electric charges accumulated in the first power system ground wiring 109 and the second power system ground wiring 116 is defined as Icdmg, an electric current generated by movement of the electric charged while being accumulated in the signal wiring 205 between the output inverter and the input inverter is defined as Icdms, and a resistance component of the first power system power supply wiring is defined as RVDD1. Upon the discharge, the voltage Vgs between the gate and the source of the NMOS of the input inverter 204 is calculated by:

$$Vgs=(Vpower+RGND1*Icdmg+RGND1D*Icdmg+Vdiode+RGND2D*Icdmg)-(Rs*Icdms+Vpmos+RVDD1*Icdms)$$

When there is a large difference between the signal wiring resistance and the ground wiring resistance, or a large difference between the signal wiring resistance and the power supply wiring resistance, the voltage Vgs is increased by generation of a time difference between the electric currents Icdmg and Icdms and the gate oxide film is thereby destroyed. Since the power supply wiring resistance and the ground wiring resistance are normally small, it is important to reduce the signal wiring resistance RS in order to prevent the destruction of the gate oxide film by the CDM.

The circuit configuration of the LSI of this embodiment will be described in detail with reference to FIG. 1. In the LSI of this embodiment, the first power system input/output circuit 104 and the second power system input/output circuit 111 are placed closely to each other. It is more preferable that the first power system input/output circuit 104 and the second power system input/output circuit 111 are placed so as to contact each other at a boundary between the first power system circuit 101 and the second power system circuit 102. It is possible to reduce the ground wiring resistance by arranging the first power system input/output circuit 104 closely to the second power system input/output circuit 111.

With reference to FIG. 2, it is possible to reduce the ground wiring resistance values of RGND1D and RGND2D. Accordingly, it is possible to reduce the MOS gate potential attributable to the ESD surge and thereby to suppress the destruction of the gate oxide film. Otherwise, since it is possible to reduce the signal wiring resistance RS, it is therefore possible to suppress delay in electric current between the ground wiring and the signal wiring upon the discharge of the accumulated capacitance.

The delay between the input/output circuits in the first power system and the second power system is formed small in light of the ESD. The wiring delay can be realized by shortening a wiring length, increasing a wiring width, or reducing the wiring resistance. By suppressing the wiring delay, it is possible to suppress the destruction of the gate insulating film attributable to the time difference in the ESD discharge currents.

The first and second input/output circuit units 104 and 111 are respectively coupled to the relevant ground wiring in the vicinity of the protection element 117 between the sets of the ground wiring. In this way, it is possible to reduce the ground wiring resistance in the ESD surge current path. With reference to FIG. 2, it is possible to reduce the ground wiring resistance values of RGND1D and RGND2D.

The respective ground pads 108 and 115 in the first and second power system are coupled to the vicinity of the protection element 117 between the sets of the ground wiring. The ground pad 115 in the second power system is preferably coupled to the second power system ground wiring 116 at a node 118 located between the protection element 117 and a node 119 for the second power system input/output circuit and the second power system ground wiring. The ESD surge current path bypassing the input/output circuit unit is formed by connecting the ground pad more closely to the protection element than the input/output circuit unit, and it is possible to suppress an influence by the ESD surge to the input/output circuit unit (or the gate voltage Vgs inside the circuit unit). Similarly, the ground pad 108 in the first power system is coupled to the first power system ground wiring 109 at a node 120 located between the protection element 117 and a node 121 for the first power system input/output circuit and the first power system ground wiring.

As described above, according to this embodiment, when there are the plurality of power systems inside the LSI chip, it is possible to suppress the resistance values the resistors being parasitic on the power supply lines and thereby to prevent destruction of the elements inside the chip. Moreover, it is possible to prevent the ESD destruction of the elements inside the chip without depending on the circuit configuration of the inside of the LSI and thereby to obtain the high ESD tolerance stably.

Second Embodiment

Figure 4A:
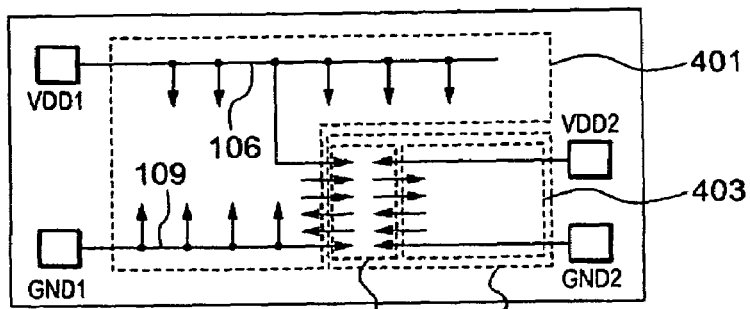
FIG. 4A depicts a circuit configuration of an LSI device according to a second embodiment of the present invention.

FIG. 4A is a circuit diagram showing a schematic configuration of an LSI according to a second embodiment of the present invention. The LSI of this embodiment includes a digital circuit as a first power system circuit, and an analog circuit as a second power system circuit. Part of the analog circuit is designed as an analog macro, and the analog macro contains a first power system input/output circuit to be operated by a first power supply.

In FIG. 4A, the LSI of this embodiment includes a digital circuit unit 401 and an analog macro 402. The analog macro 402 includes an analog internal circuit 403 and an input/output circuit unit 404.

Figure 4B:
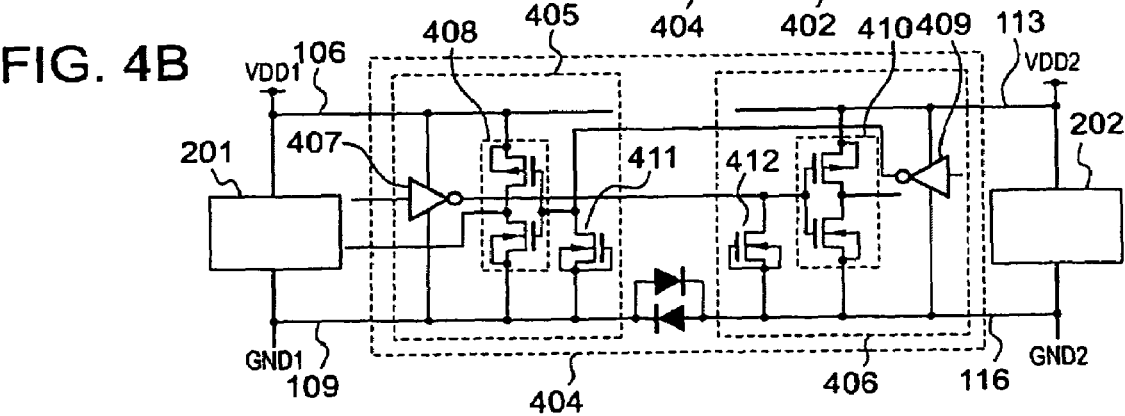
FIG. 4B depicts a circuit configuration of another LSI device according to the second embodiment of the present invention.

FIG. 4B is a circuit diagram showing a detailed configuration of the input/output circuit unit 404 of the analog macro. The input/output circuit unit 404 includes a first power system input/output circuit unit 405 and a second power system input/output circuit unit 406. In FIG. 4B, the input/output circuit unit 404 of the analog macro includes a first power system output inverter 407, a first power system input inverter 408, a second power system output inverter 409, a second power system input inverter 410, and a gate protection element 411.

The gate protection element 411 is formed of an NMOS transistor which is coupled to a gate for receiving an input signal of the first power system input inverter 408 and to the first power system ground wiring 109. When a high voltage is generated, the gate protection element 411 clamps electric potential between a gate and a source of the input inverter to clamp potential. Accordingly, it is possible to suppress destruction of a gate insulating film by maintaining the electric potential between the gate and the source of the input inverter within the clamp potential. Various widely known elements can be used as such a clamp element.

Similarly, a gate protection element 412 is coupled between a gate for receiving an input signal of the second power system input inverter 410 and the second power system ground wiring 116. The clamp element can be also coupled between the gate for receiving the input signal of the input inverter and the power supply wiring. For example, the clamp element is coupled between the gate for receiving the input signal of the second power system input inverter 410 and the second power system power supply wiring 113. An output of the first power system output inverter is coupled to the second power system input inverter with connection wiring, and an output of the second power system output inverter is coupled to the first power system input inverter with connection wiring.

By arranging the first power system input/output circuit unit and the second power system input/output unit inside the analog macro, it is possible to design a countermeasure for the ESD inside the analog macro. That is, ESD designing in LSI chip layout designing is facilitated and the ESD designing in digital circuit designing can be curtailed.

Moreover, by arranging the two input/output circuit units inside the analog macro, the first power system input/output circuit unit and the second power system input/output circuit unit are placed at a boundary between the first power system circuit unit and the second power system circuit unit so as to prevent the electrostatic destruction. In this way, it is easier to design placement in a vicinity region.

As described above, according to this embodiment, it is possible to prevent the ESD destruction inside the chip, to achieve a connection cell to realize the LSI having high ESD tolerance in a small area, and to perform automated designing when separating the power supply of the hard macro designed by another company with another power supply inside the chip.

Third Embodiment

Figure 5:
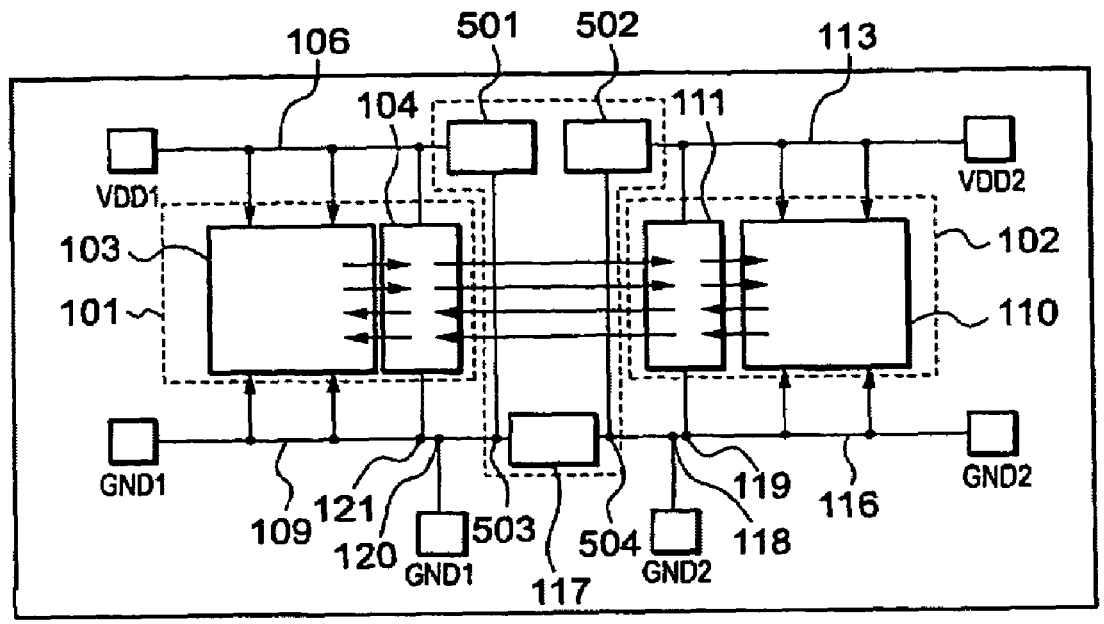
FIG. 5 depicts a circuit configuration of an LSI device according to a third embodiment of the present invention.

Next, a third embodiment according to the present invention will be described with reference to FIG. 5. FIG. 5 is a circuit diagram showing a schematic configuration of an LSI device of this embodiment. As described in FIG. 5, the LSI device of this embodiment includes a protection element 501 between VDD1 and GND1 which is coupled between the first power system power supply wiring 106 and the first power system ground wiring 109, and a protection element 502 between VDD2 and GND2 which is coupled between the second power system power supply wiring 113 and the second power system ground wiring 116.

In general, the power supply protection element clamps the electric potential between the power supply and the ground to the clamp potential upon application of the ESD if the potential difference between the power supply and the ground reaches or exceeds the clamp potential. Various widely known elements, such as a clamp element applying a transistor, can be used as the protection elements.

The protection element 501 between VDD1 and GND1 is coupled to the first power system ground wiring 109 at a node 503. The node 503 is placed in the vicinity of the protection element 117 between the sets of the ground wiring. In this way, it is possible to reduce the ground wiring resistance between the node and the protection element 117 so as to contribute to reduction in the ground wiring resistance of the ESD surge current.

Preferably, the node 503 is placed between the node 121 for the first power system input/output circuit unit and the first power system ground wiring, and, the protection element 117 between the sets of the ground wiring. By forming a bypass of the ESD current path with respect to the node of the input/output circuit, it is possible to suppress the influence to the input/output circuit by the ESD surge current.

Similarly, the protection element 502 between VDD2 and GND2 is coupled to the second power system ground wiring 116 at a node 504. The node 504 is placed in the vicinity of the protection element 117 between the sets of the ground wiring. Preferably, the node 504 is placed closer to the protection element 117 between the sets of the ground wiring than the node 119 for the second power system input/output circuit unit and the second power system ground wiring. The protection element 501 between VDD1 and GND1, the protection element 502 between VDD2 and GND2, and the protection element 117 between the sets of the ground wiring are formed within one cell. In this way, it is easy to perform the ESD designing by arranging one pre-designed cell at a boundary of the circuits to be operated by different power systems.

Fourth Embodiment

Figure 6:
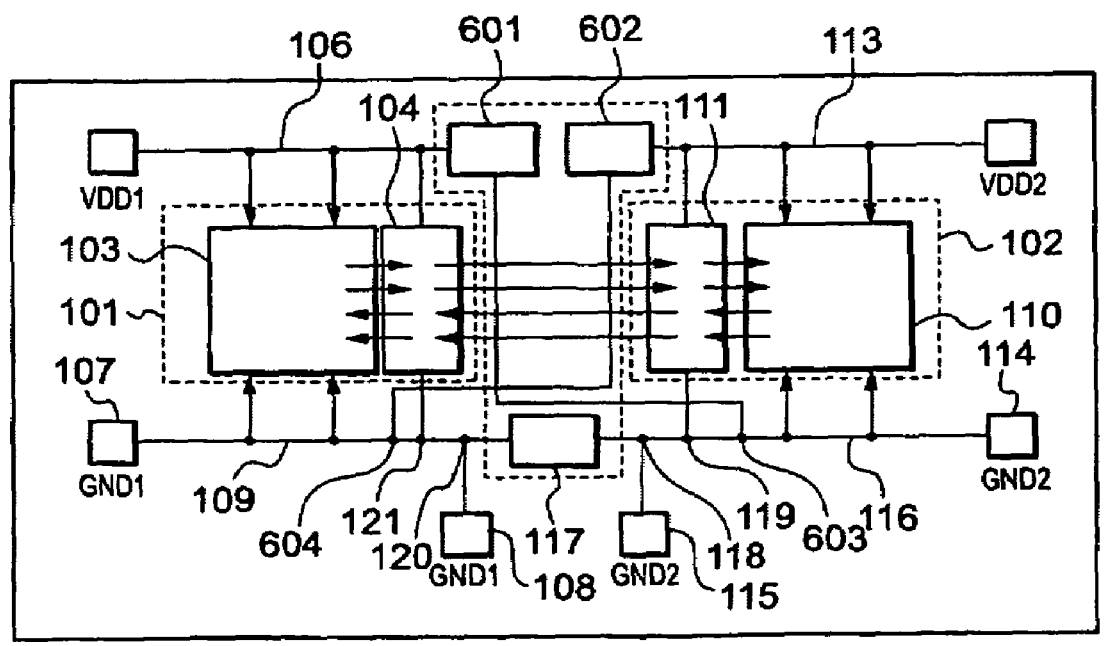
FIG. 6 depicts a circuit configuration of an LSI device according to a fourth embodiment of the present invention.

Next, a fourth embodiment according to the present invention will be described with reference to FIG. 6. FIG. 6 is a circuit diagram showing a schematic configuration of an LSI device of this embodiment. In the LSI device of this embodiment, the ESD protection elements are provided between the power supplies and the grounds in mutually different power systems. As described in FIG. 6, the LSI device according to the fourth embodiment of the present invention includes a protection element 601 between VDD1 and GND2 which is coupled between the first power system power supply wiring 106 and the second power system ground wiring 116, and a protection element 602 between VDD2 and GND1 which is coupled between the second power system power supply wiring 113 and the first power system ground wiring 109.

A node 603 for the protection element 601 between VDD1 and GND2 and the ground wiring 116 is coupled to a position farther than the node 119 for the second power system input/output circuit unit and the second power system ground wiring when viewed from the protection element 117 side. The node 603 is placed between the node 119 and the second power system ground pad 114. A node 604 for the protection element between VDD2 and GND1 and the ground wiring is coupled between the node 121 for the first power system input/output circuit unit and the first power system ground wiring, and the first power system ground pad 107.

Consideration is made on the ESD surge current path to be formed from the first power system power pad VDD1 to the second power system ground pad GND2 by coupling the first power system power supply wiring to the second power system ground wiring through the protection element. The node 603 for the protection element 601 between VDD1 and GND2 and the ground wiring 116 is placed closer to the ground pad 114 than the node 119 for the first power system input/output circuit unit and the first power system ground wiring. Accordingly, the ESD surge current path by passing the node for the second power system input/output circuit unit and the ground wiring is formed, and the influence to the second power system input/output circuit unit by the ESD surge current can be thereby suppressed. Similarly, regarding connection between the second power system power supply wiring 113 and the first power system ground wiring 109 through the protection element 602 between VDD2 and GND1, it is possible to suppress the influence to the first power system input/output circuit unit concerning the ESD surge current path starting from the second power system power pad.

Each of the protection element 601 between VDD1 and GND2, the protection element 602 between VDD2 and GND1, and the protection element 117 between the sets of the ground wiring can be formed in one cell. It is easy to perform the ESD designing by arranging one pre-designed cell at a boundary of the circuits to be operated by different power systems.

Fifth Embodiment

Figure 7:
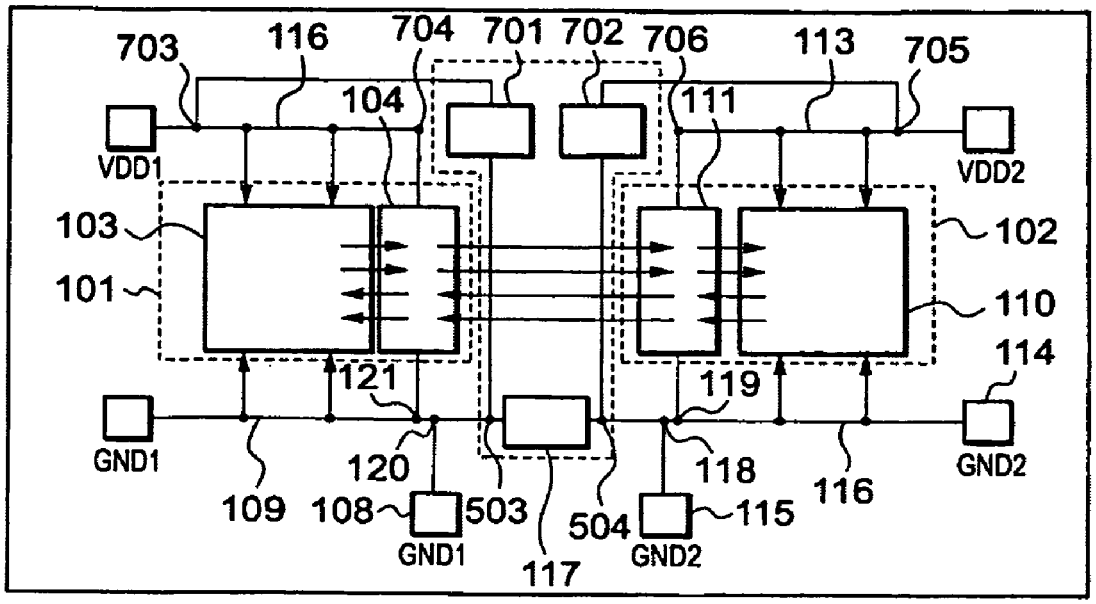
FIG. 7 depicts a circuit configuration of an LSI device according to a fifth embodiment of the present invention.

Next, a fifth embodiment according to the present invention will be described with reference to FIG. 7. FIG. 7 is a circuit diagram showing a schematic configuration of an LSI device of this embodiment. In the LSI device of this embodiment, the ESD protection elements are provided between the power supplies and the grounds mutually in the same power systems. As described in FIG. 7, the LSI device according to the fifth embodiment of the present invention includes a protection element 701 between VDD1 and GND1 which is coupled between the first power system power supply wiring 106 and the first power system ground wiring 109, and a protection element 702 between VDD2 and GND2 which is coupled between the second power system power supply wiring 113 and the second power system ground wiring 116. The elements to be used as the protection elements are similar to those used in the fourth embodiment.

A node 703 for the protection element 701 between VDD1 and GND1 and the first power system power supply wiring 106 is coupled between the first power system power pad 105 and a node 704 for the first power system input/output circuit 104 and the first power system power supply wiring 106. By coupling the protection element 701 between VDD1 and GND1 in a position closer to the first power system power pad than a node 704 for the first power system input/output circuit unit, it is possible to form the ESD surge current path bypassing the node for the first power system input/output circuit unit. The ESD surge current path starting from the first power system power pad passes through the protection element 701 between VDD1 and GND1 and flows to the first power system ground wiring 109.

Therefore, unlike the circuit described with reference to FIG. 5, the ESD surge current path flowing from the first power pad. VDD1 to the first power system ground wiring through the protection element 701 between VDD1 and GND1 bypasses the node for the first power system input/ output circuit. In this way, it is possible to suppress the influence to the first power system input/output circuit unit by the ESD surge current.

Regarding connection between the second power system power supply wiring and the second power system ground wiring as well, a node 705 for the protection element 702 between VDD2 and GND2 and the second power system power supply wiring 113 is coupled between the second power system power pad 112 and a node 706 for the second power system input/output circuit 111 and the second power system power supply wiring 113. In this way, the ESD surge current path bypassing the node for the second power system input/output circuit unit is formed. Accordingly, it is possible to suppress the influence to the second power system input/output circuit unit by the ESD surge current.

Concerning the protection element 601 between VDD1 and GND2 described in FIG. 6, it is also preferable that the node for the first power system power supply wiring is located closer to the power pad than the first power system input/output circuit unit. Concerning the protection element 602 between VDD2 and GND1 as well, it is preferable that the node for the second power system power supply wiring is located between the node for the second power system input/output circuit, and, the power pad. In this way, it is possible to form the ESD surge current path bypassing the node for the input/output circuit.

Now, a technique related to the present invention will be described with reference to FIG. 8. That is, description will be made below on a designing apparatus' applying a method of designing an LSI device according to the present invention.

The circuit configurations of the LSI chips capable of obtaining high ESD tolerance have been described in the first to fifth embodiments. To obtain these circuit configurations, it is necessary to perform designing in consideration of the ESD tolerance in the step of designing the LSI chips.

One of the reasons is that the circuit configuration is formed in advance so as to reduce the resistance on the path for flowing the ESD surge current for the layout designing of the LSI device. In this way, it is possible to perform automated layout designing of the LSI having the high ESD tolerance regardless of the internal circuit configuration of the LSI.

Moreover, it is possible to design the LSI chip with the high ESD tolerance by the automated layout designing so as to allow the ESD surge current path to bypass the node for the input/output circuit unit. To design the LSI device according to the present invention, it is necessary to find a position where the ESD tolerance is low.

In the circuit including the plurality of power systems, it is necessary to find the input/output circuit unit which exchanges signals between the different power systems. In particular, it is important to find a transistor to which signals are inputted from the different power systems.

Figure 8:
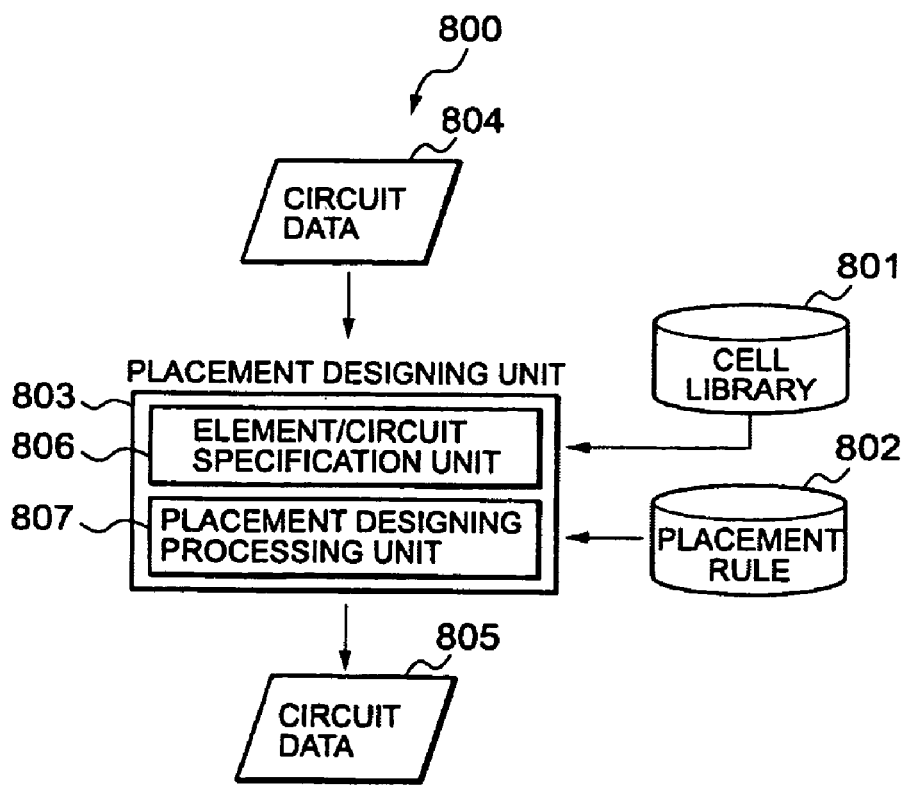
FIG. 8 depicts a logical configuration of an apparatus for designing an LSI device related to the present invention.

FIG. 8 is a constitutional view showing logic of an apparatus for designing an LSI device. With reference to FIG. 8, an LSI device designing apparatus 800 includes a cell library 801 for storing wide-ranging information concerning many cells, such as shapes of the cells or pin placements.

Moreover, the LSI device designing apparatus 800 includes a placement designing unit 803, which generates circuit data 805 for laying out the cells by use of placement rule information 802 preset in terms of the cell placements and inputted circuit data 804. The placement designing unit 803 generates the circuit data 805, which is preset in terms of the cell placements, based on the cell library and the placement rule prepared in advance. The placement designing unit 803 includes an element/circuit specification unit and a placement designing processing unit 807.

The element/circuit specification unit 806 includes a function to detect either an input/output circuit unit for exchanging signals between the different power systems or a specific circuit in the input/output circuit unit based on the circuit data 804 and the cell data. In the placement designing of the entire circuit, the placement designing processing unit 807 can place the specified input/output circuit unit in accordance with the predetermined placement rule 802.

Figure 10:
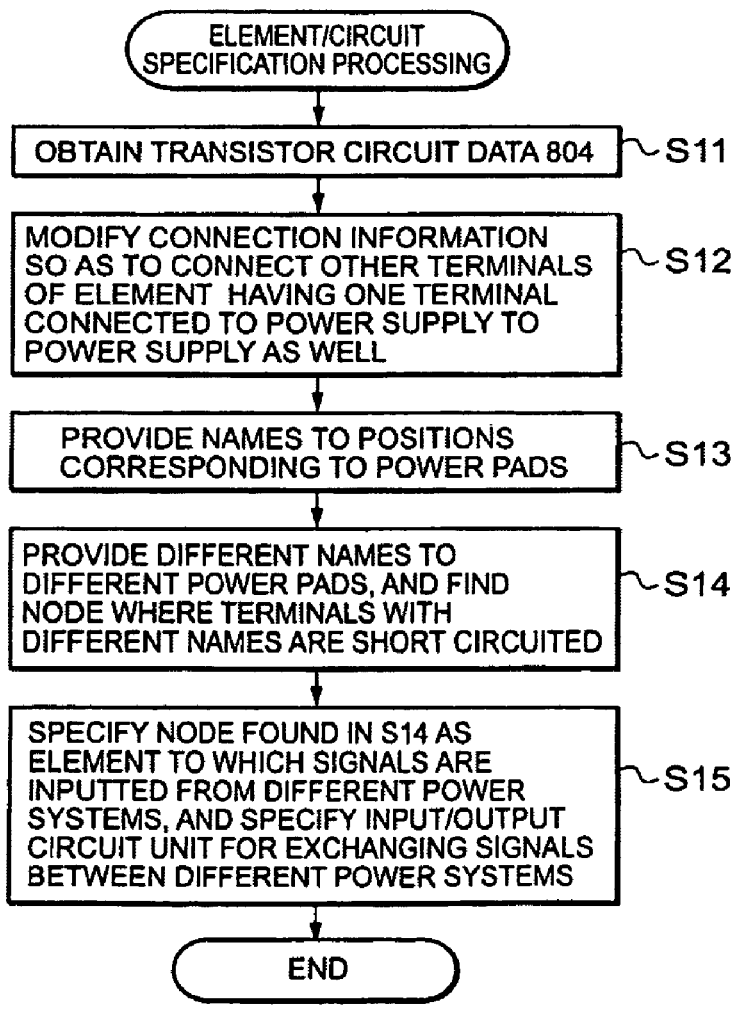
FIG. 10 is a flowchart which depicts an element/circuit specification processing flow in the apparatus for designing an LSI device related to the present invention.

Next, the processing of the element/circuit specification unit 806 in the layout designing by the LSI device designing apparatus 800 will be described with reference to FIG. 10. One of the processing for finding the transistor to which the signals are inputted from the different power systems may include the following processing flow.

Firstly, the transistor circuit data 804 subject to layout designing are obtained (Step S11). In the circuit data, regarding an element including at least one terminal coupled to a power terminal, connection information is modified such that other terminals not have been coupled to the power supply are coupled to the power supply as well, or alternatively, such that the element is short circuited (Step S12).

For example, regarding a MOS transistor in which a source out of drain, gate, source, and back gate thereof is coupled to the power terminal, the drain, gate, and back gate are also coupled to the power supply. Here, instead of short circuiting the element by modifying the connection information, it is also possible to prepare a cell which is short circuited in advance and replace the original element with the cell.

Next, certain names are provided to positions corresponding to the power pads (Step S13). In this event, different names are provided to different power pads. Lastly, a node where the terminals with the different names are short circuited is found out (Step S14).

This node is specified as the element to which the signals are inputted from the different power systems. When the node to which the signals are inputted from the different power systems is specified, the input/output circuit unit for exchanging the signals between the different power systems is specified (Step S15).

When the element and the input/output circuit unit are specified, the layout designing is executed by the placement designing processing unit 807 based on the predetermined placement rule 802 so as to realize any of the circuit configurations which are described in the first to fifth embodiments.

For example, the input/output circuit units of the different power systems are designed to be placed in a vicinity area and placed at the boundary between the different power systems. Alternatively, ESD wiring delay between an input circuit and an output circuit is designed to be reduced. The ESD wiring delay can be reduced by reducing a wiring length or by designing to reduce an increase in wiring width or to reduce resistance.

The circuit designing is performed similarly in the respective aspects of connection described above concerning the power supply wiring, the ground wiring, and the protection elements, based on a rule which is expressly indicated as the designing rule concerning the ESD. Meanwhile, it is possible to perform designing so as to add a cell including a clamp element as a protection element for preventing destruction of the gate insulating film, or to replace the original element with such a cell, by means of specifying the MOS transistor to which the signals are inputted from the different power systems.

Figure 9:
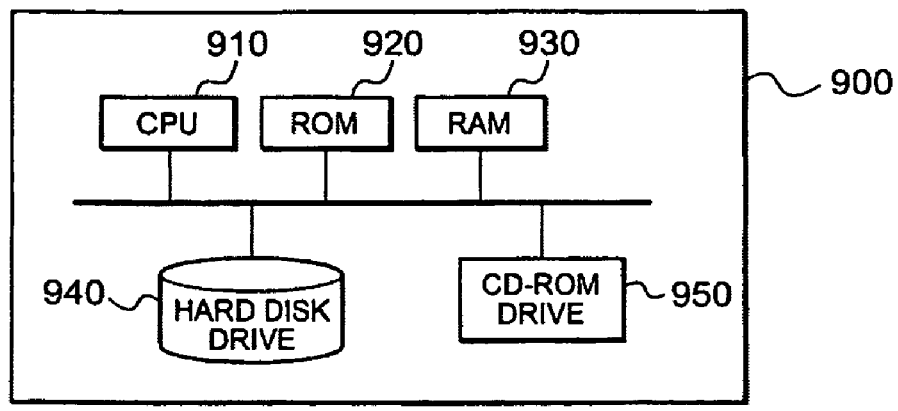
FIG. 9 depicts a hardware configuration of the apparatus for designing an LSI device related to the present invention.

FIG. 9 shows one example of a hardware configuration of a designing apparatus 900 of the above-described related technique. The function of the designing apparatus 900 is achieved in combination of: a computer which includes a CPU 910, a ROM 920, a RAM 930, a hard disk drive 940, and a CD-ROM drive 950 as an external storage device and a program to be executed on the computer. The cell library 801 and the placement rule 802 can be stored in the hard disk 940 in advance. The program for achieving the function as the designing device can cause the computer to function as the element/circuit specification unit 806, the placement designing processing unit 807, a cell library storage unit, and a placement rule storage unit. The program or necessary data can be recorded on various recording media including a flexible disk, a CD-ROM, an optical disk, a magnetooptical disk, a tape medium, and the like.

As described above, according to this embodiment, it is possible to provide the designing apparatus capable of easily designing the LSI which achieves the high ESD tolerance. In particular, it is possible to provide the designing apparatus capable of performing the automated layout designing of the LSI having the high ESD tolerance. Alternatively, it is possible to eliminate restrictions upon the automated designing by forming a device for reducing the resistance of the path for flowing the ESD surge current in advance.

That is, according to the present invention, it is possible to obtain the LSI which achieves the high ESD tolerance.

It is apparent that the present invention is not limited to the above embodiments, but may be modified and changed without departing from the scope and spirit of the invention.

What is claimed is:

1. A semiconductor integrated device, comprising:
   a first circuit unit to which electric power is supplied from a first power supply wiring and a second power supply wiring;
   a second circuit unit to which electric power is supplied from a third power supply wiring and a fourth power supply wiring;
   a first interface circuit unit formed in the first circuit unit; and
   a second interface circuit unit formed in the second circuit unit, the second interface circuit unit being configured to perform any of inputting and outputting a signal to and from the first interface circuit unit,
   wherein the second power supply wiring is coupled to the fourth power supply wiring at a node, wherein the second interface circuit unit and the first interface circuit are arranged with respect to each other in an arrangement that reduces a wiring resistance in an electrostatic discharge current path within the semiconductor integrated device, and wherein the arrangement of the second interface circuit and the first interface circuit is independent of a configuration of other circuits within the semiconductor integrated device.

2. The semiconductor integrated device according to claim 1, wherein the second interface circuit unit is placed in the vicinity of the first interface circuit unit.

3. The semiconductor integrated device according to claim 1, wherein the first interface circuit unit and the second interface circuit unit are placed at a boundary between the first circuit unit and the second circuit unit.

4. The semiconductor integrated device according to claim 1, wherein the first interface circuit unit is an interface circuit unit in a first internal circuit unit and the second interface circuit unit is an interface circuit unit in a second circuit unit, and the first internal circuit unit has a larger number of elements than the second internal circuit.

5. The semiconductor integrated device according to claim 1, wherein the first interface circuit unit is an interface circuit unit in a first internal circuit unit and the second interface circuit unit is an interface circuit unit in a second circuit unit, and the first internal circuit unit has a larger chip area than the second internal circuit.

6. The semiconductor integrated device according to claim 1, wherein the second interface circuit unit is coupled to the fourth power supply wiring in the vicinity of the node for the second power supply wiring and the fourth power supply wiring.

7. The semiconductor integrated device according to claim 1, wherein the first interface circuit unit is coupled to the second power supply wiring in the vicinity of the node for the second power supply wiring and the fourth power supply wiring.

8. The semiconductor integrated device according to claim 1, further comprising an external connection pad coupled to the fourth power supply wiring in the vicinity of the node for the second power supply wiring and the fourth power supply wiring.

9. The semiconductor integrated device according to claim 1, further comprising an external connection pad coupled to the fourth power supply wiring, and wherein a node for the external connection pad and the fourth power supply wiring is located between a node for the second interface circuit unit and the fourth power supply wiring and the node for the second power supply wiring and the fourth power supply wiring.

10. The semiconductor integrated device according to claim 1, wherein a node for the second interface circuit unit and the fourth power supply wiring is located between the node for the second power supply wiring and the fourth power supply wiring and a node for the fourth power supply wiring and an external connection pad.

11. The semiconductor integrated device according to claim 1, wherein each of the first interface circuit unit and the second interface circuit unit comprises a clamp element configured to protect a gate for receiving an input signal.

12. The semiconductor integrated device according to claim 1, wherein wiring delay between the first interface circuit unit and the second interface circuit is designed to be equal to or less than a given value.

* * * * *